March 29, 1960     T. J. CARPENTER     2,930,924
WIND SHIELDED EXTERNAL AIR GAP
Filed June 25, 1956
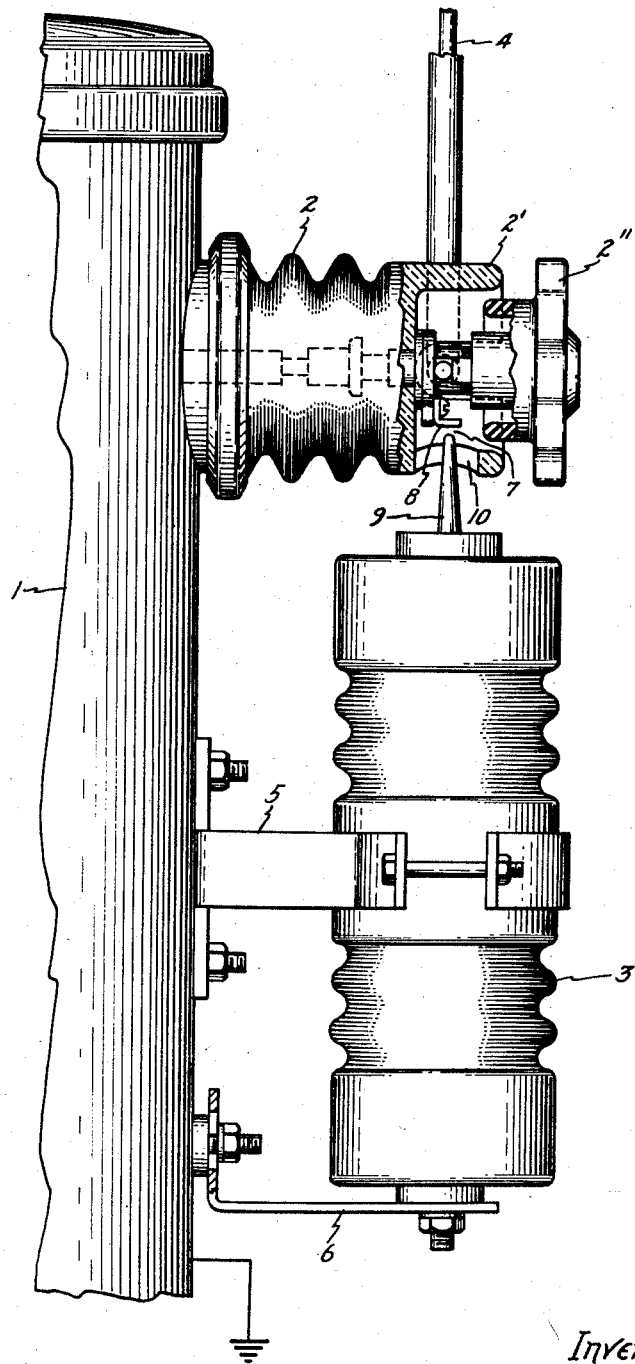
Inventor
Thomas J. Carpenter,
by
His Attorney.

though it is aimed in the appended claims to cover all such changes and modifications as fall within the true spirit and scope of the invention.

United States Patent Office 2,930,924
Patented Mar. 29, 1960

2,930,924

WIND SHIELDED EXTERNAL AIR GAP

Thomas J. Carpenter, Pittsfield, Mass., assignor to General Electric Company, a corporation of New York Application June 25, 1956, Serial No. 593,573

3 Claims. (Cl. 313—231)

This invention relates to a wind shielded external air gap, and more particularly to a bushing to lightning arrester wind shielded external air gap.

Outages have been caused in electrical distribution systems during storms which are accompanied by high winds. These outages result in an interruption in electrical service, and in the case of electrical apparatus which is enclosed within a tank, such as distribution transformers, severe tank burning has also occurred. Tests I have conducted on conventional distribution transformers which are provided with an external air gap between the transformer bushing and adjacent lightning arrester show that such outages and tank burning is caused by blowing of the external arc across said gap into contact with the tank.

Accordingly, it is an object of this invention to provide a bushing to lightning arrester wind shielded or protected external air gap.

In one form of my invention the external electrode of the lightning arrester which together with the electrode of the bushing forms the external air gap extends into the interior of the bushing whereby the external air gap is disposed inside of the bushing and thereby protected or shielded from high winds.

While the specification concludes with claims particularly pointing out and distinctly claiming the subject matter which I regard as my invention, it is believed the invention will be better understood from the following description taken in connection with the accompanying drawing in which the single figure thereof is a broken away side elevation view of one form of my invention.

A transformer tank 1 is illustrated as having a tank side wall porcelain or other electrical insulating material bushing 2 extending perpendicular from the tank side wall. A lightning arrester unit 3 is mounted on the tank side wall generally below the bushing 2 and is disposed such that its lengthwise axis extends in a direction generally perpendicular to the lengthwise axis of the bushing 2. Both the bushing 2 and lightning arrester 3 are conventional components and only those parts will be described which are believed to be necessary for a complete understanding of the invention.

The outer end of the bushing 2 has an integral cylindrical flange 2' formed thereon in which the terminal clamp parts of the bushing are disposed. The terminal clamp is tightened or loosened by appropriate operation of a hand knob 2" which substantially closes the outer open end of the bushing 2. The bushing is adapted to have an external electrical lead 4 connected thereto. The lead 4 can be inserted into the bushing through a suitable aperture formed in the remote side of flange 2' when viewing the drawing.

The lightning arrester 3 is mounted on the tank side wall by a strap 5 or the like. In the particular form of the invention illustrated in the drawing the tank 1 is connected to ground and the lower end of the lightning arrester 3 is connected to the tank side wall by a conducting strip 6 which in effect means that the lower end of the lightning arrester 3 is grounded. The parts so far described are conventional.

The external air gap 7 between the bushing and lightning arrester is defined by a pair of closely spaced electrodes 8 and 9. The electrode 8 is disposed within the flange 2' of the bushing and is electrically connected to a portion of the terminal clamp of the bushing. The electrode 9 is electrically connected to the upper end of the lightning arrester 3 and extends through an aperture 10 formed in the bottom of flange 2' into the bushing 2 within the confines of the flange 2'. Accordingly, the external air gap 7 is shielded and protected from high winds. The electrode 9 should be spaced from the edges of aperture 10 so that no current leakage path is provided along the interior of flange 2' between electrodes 8 and 9.

In the prior art arrangement the electrode 9 would not have extended into the bushing 2 but would have been positioned outside of the flange 2' and the electrode 8 would have extended through the aperture 10 to a position disposed outside of the flange 2'. This means that the external air gap 7 would have been disposed externally of the bushing 2 and thereby be exposed to high winds. Of course it is within the scope of this invention to still have the electrode 8 extend through the aperture 10 and have the electrode 9 positioned outside of the aperture 10, as in the prior art arrangement, and then to shield the air gap 7, which would then be positioned externally of the bushing 2, by suitable wind shields or barriers. Such wind shields could be formed integrally with the bushing 2 about the aperture 10 or could be parts which are separately connected to the bushing 2 or the lightning arrester 3 to substantially completely enclose and shield or protect the air gap from high winds. However, it will be appreciated that in power and distribution transformers the bushing 2 is conventionally made from ceramic and forming integral shields or barriers thereon would raise the cost thereof. This would be true even in separately connected barriers which might also increase the number of necessary parts. Therefore, in my invention it is preferred to shield the air gap 7 by having it positioned within the bushing in the manner illustrated in the drawing.

In tests I have conducted an electrical arc was established across the air gap 7 and winds having a velocity of about 30 to 60 miles per hour were directed against the tank 1 in a direction generally parallel to the axis of the bushing 2. In the conventional arrangement wherein the air gap 7 was not shielded or protected the electrical arc across the gap 7 was caused to transfer from the electrode 9 over to the side wall of tank 1. However, when the external air gap 7 was positioned within the bushing 2 and shielded and protected from the wind in the manner illustrated in the drawing the electrical arc was retained across the electrodes 8 and 9 and did not transfer therefrom to the side wall of the tank 1.

Although the member 8 is illustrated as comprising an electrode 8 which is separately fabricated and then electrically connected to the terminal clamp of the bushing, it will be obvious that the equivalent of electrode 8 can be formed integrally with the terminal clamp or that a part of the terminal clamp itself can serve as the equivalent of the electrode 8. Therefore, by the term an electrode which is connected to said bushing is meant either a separately fabricated member which is then electrically connected to the bushing terminal clamp or an integral part of said bushing terminal clamp which will provide a terminus for the arc across gap 7.

While there has been shown and described a particular embodiment of the invention, it will be obvious to those skilled in the art that changes and modifications may be made without departing from the invention, and there-

What I claim as new and desire to secure by Letters Patent of the United States is:

1. A transformer having a bushing mounted externally of the transformer, and a lightning arrester mounted on the side wall of such transformer in close proximity to said bushing, said bushing and said lightning arrester being electrically isolated from each other by an air gap, said air gap being defined by an electrode which is connected to said lightning arrester and an electrode which is connected to said bushing, said electrodes being spaced from each other, and means for shielding said air gap from high winds, said means substantially enclosing said air gap to protect the same from said winds.

2. In a bushing and lightning arrester which are disposed adjacent to each other but are electrically isolated from each other by an air gap, said gap being defined by an electrode which is connected to said lightning arrester and an electrode which is connected to and disposed within said bushing, both of said electrodes being spaced from each other, said lightning arrester electrode extending into said bushing in closely spaced relationship with respect to said bushing electrode whereby said gap is shielded by said bushing from high winds.

3. In a transformer enclosed within a tank and having a ceramic side wall bushing extending generally perpendicular from a side wall thereof, said bushing adapted to have an external lead connected thereto, a lightning arrester mounted on said side wall generally below said bushing and outside said tank, said lightning arrester having its lengthwise axis aligned generally perpendicular to the lengthwise axis of said bushing, the lower end of said lightning arrester being connected to ground, and a wind shielded air gap being provided between the upper end of said lightning arrester and said bushing, said gap comprising an electrode connected to said upper end which extends into said busing in closely spaced relationship with respect to an electrode of said bushing whereby said gap is shielded by said bushing from high winds.

References Cited in the file of this patent
UNITED STATES PATENTS

| | | |
|---|---|---|
| 2,108,465 | Austin | Feb. 15, 1938 |
| 2,145,375 | Schultz | Jan. 31, 1939 |
| 2,623,197 | Kalb | Dec. 23, 1952 |
| 2,661,439 | Stoelting | Dec. 1, 1953 |
| 2,688,105 | Hasselhorn | Aug. 31, 1954 |